United States Patent [19]
Pye

[11] Patent Number: 5,634,622
[45] Date of Patent: Jun. 3, 1997

[54] REMOTE CONTROLLABLE TELEVISION VIEWING STAND

[76] Inventor: Craig D. Pye, R.D. 8, Box 285A1, Dover, Del. 19901

[21] Appl. No.: 529,325

[22] Filed: Sep. 18, 1995

[51] Int. Cl.⁶ .................................................. A49G 29/00
[52] U.S. Cl. .................. 248/371; 248/923; 248/349.1; 310/91; 310/67 R; 310/40.5
[58] Field of Search .................. 310/40.5, 67 R, 310/91, 114, 83; 248/371, 171, 131, 349.1, 919–923; 348/838, 825

[56] References Cited

U.S. PATENT DOCUMENTS

| | | | |
|---|---|---|---|
| 4,577,827 | 3/1986 | Eliscu | 248/656 |
| 4,635,894 | 1/1987 | Sammons | 248/558 |
| 4,690,362 | 9/1987 | Helgeland | 248/404 |
| 4,706,920 | 11/1987 | Ojima et al. | 248/371 |
| 4,720,805 | 1/1988 | Vye | 364/525 |
| 4,831,296 | 5/1989 | Nagaba | 310/86 |
| 5,058,842 | 10/1991 | Zemlin et al. | 248/178 |
| 5,124,805 | 6/1992 | Chung et al. | 358/248 |
| 5,287,210 | 2/1994 | Sefidvash | 359/147 |
| 5,357,180 | 10/1994 | Speicher | 318/49 |
| 5,383,721 | 1/1995 | Thomas | 312/7.2 |

*Primary Examiner*—Steven L. Stephan
*Assistant Examiner*—Tran N. Nguyen

[57] ABSTRACT

A remote controllable television viewing support including a rigid base; a rigid platform positioned above of the base and having a substantially horizontal longitudinal axis, a substantially vertical central axis, and a size for supporting a television thereon; an electrical motor mechanism coupled to the platform for allowing the platform to rotate about its longitudinal axis, thereby causing a supported television to tilt, and for allowing the platform to rotate about its central axis, thereby causing a supported television to swivel; a power supply mechanism for providing electrical energy to the motor mechanism; an infrared signal detecting and switching mechanism coupled to the power source mechanism and the motor mechanism for energizing the motor mechanism for selective rotation of the platform based upon detection of an infrared signal; and a hand-held and manually-operated remote control mechanism positionable at a location remote from the infrared detecting and switching mechanism for selectively radiating one of a plurality of infrared signals upon actuation by a user.

2 Claims, 3 Drawing Sheets

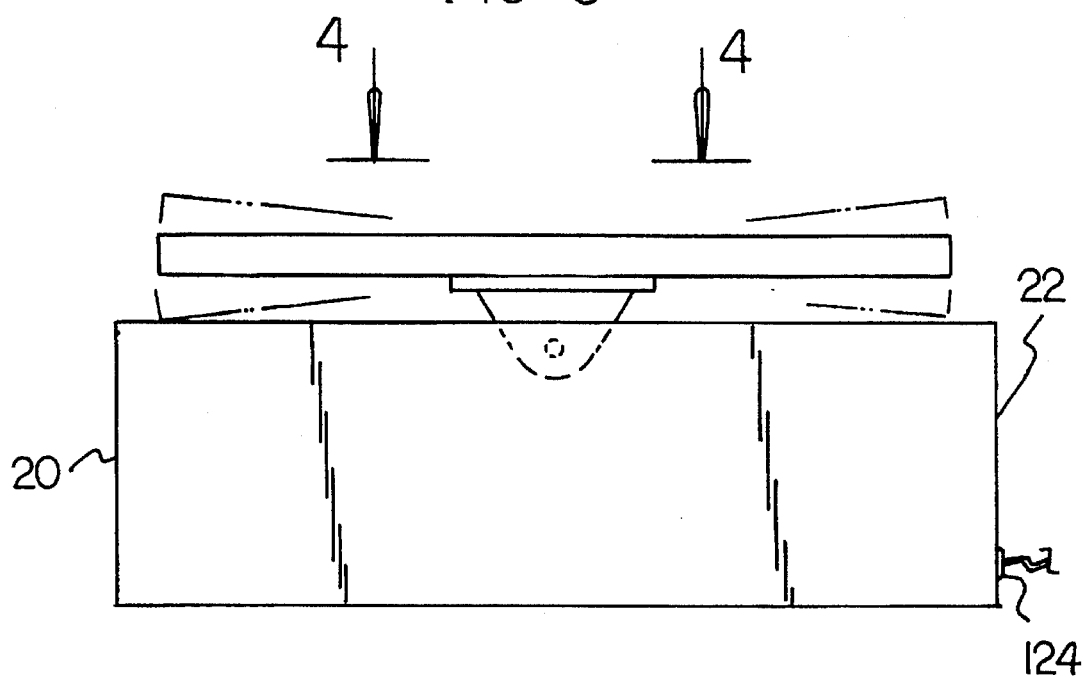
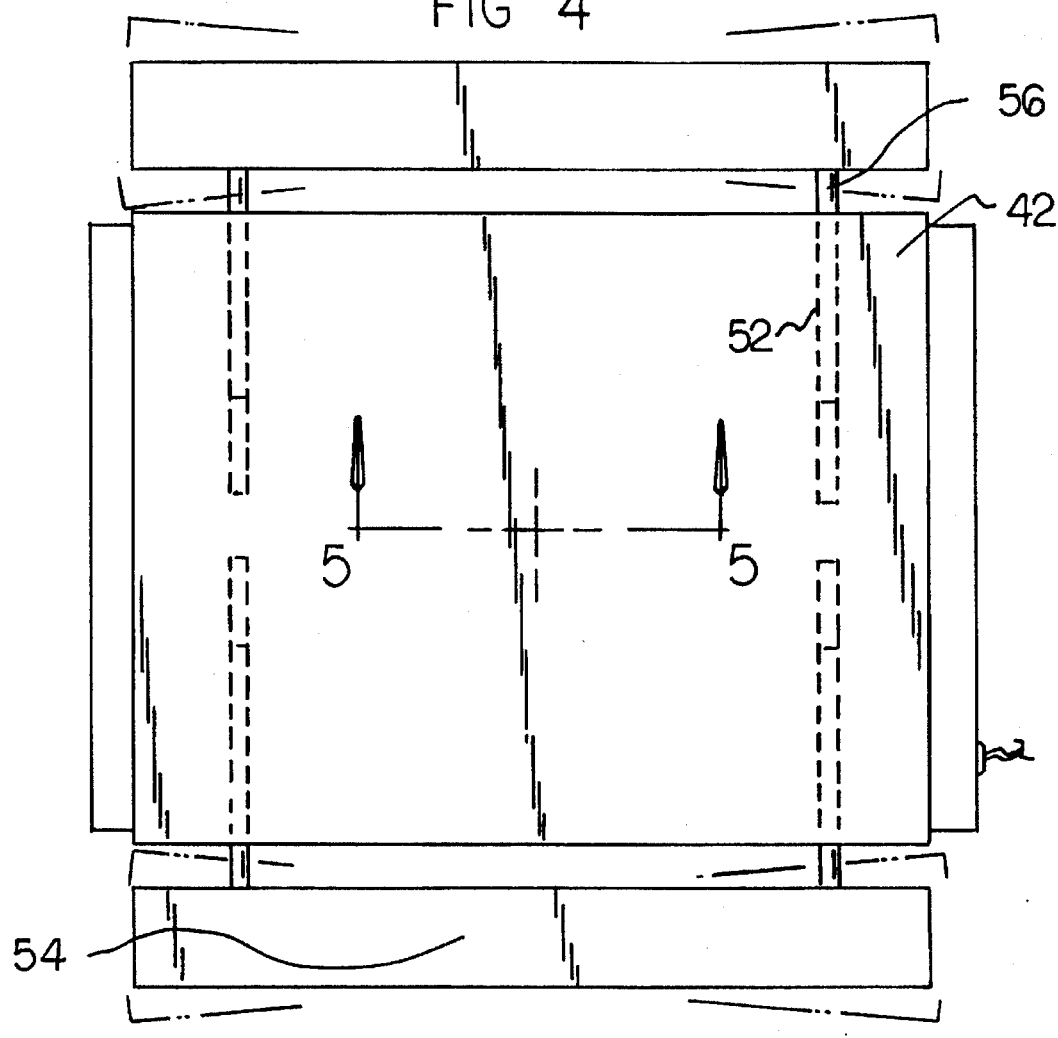

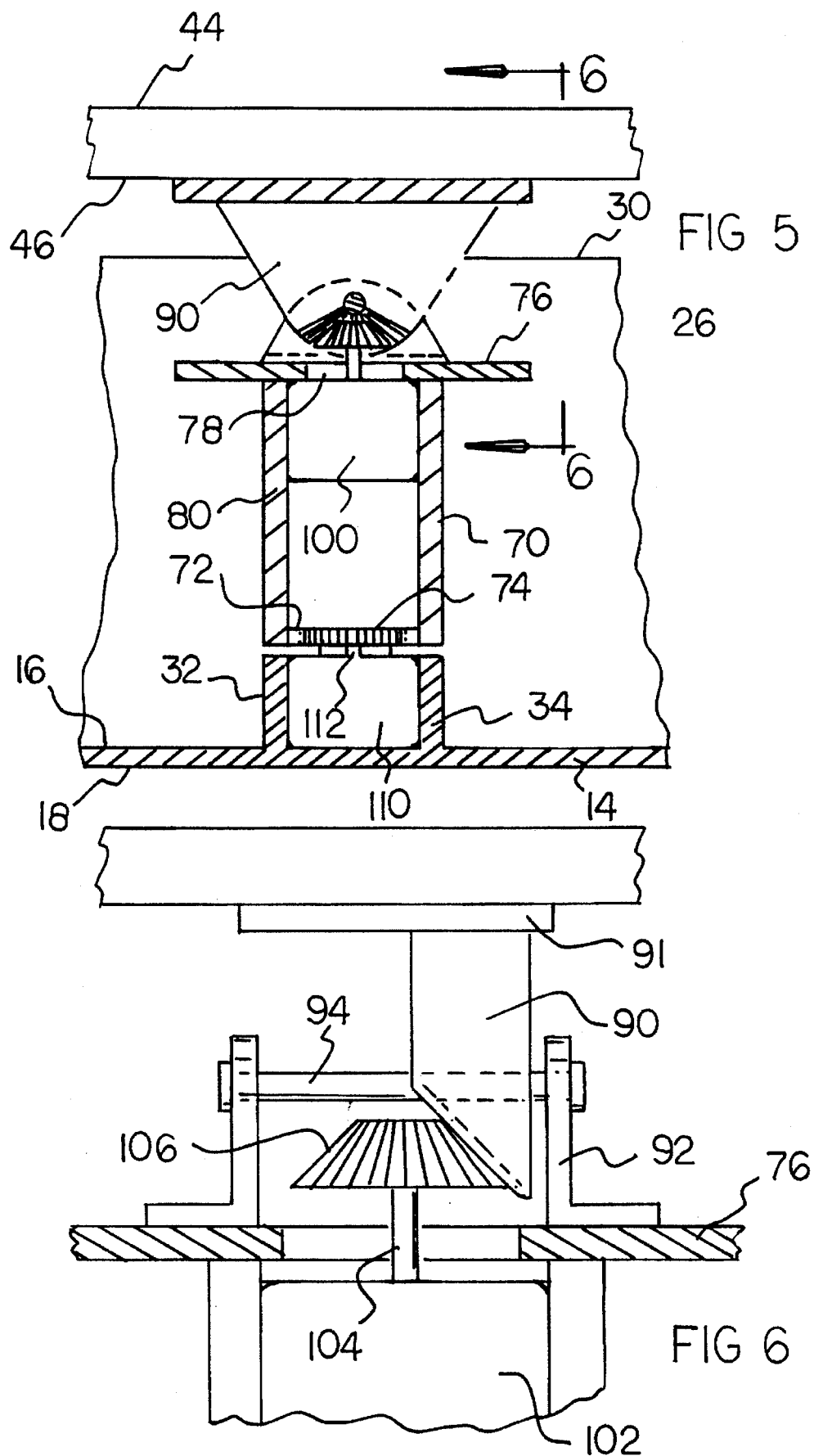

REMOTE CONTROLLABLE TELEVISION VIEWING STAND

BACKGROUND OF THE INVENTION

1. Field of the Invention

The present invention relates to a remote controllable television viewing support and more particularly pertains to allowing a user to remotely adjust a position of a television for viewing with a remotely controllable television viewing stand.

2. Description of the Prior Art

The use of adjustable television stands and supports is known in the prior art. More specifically, adjustable television stands and supports heretofore devised and utilized for the purpose of allowing a position of a television to be adjusted for viewing are known to consist basically of familiar, expected and obvious structural configurations, notwithstanding the myriad of designs encompassed by the crowded prior art which have been developed for the fulfillment of countless objectives and requirements.

By way of example, U.S. Pat. Des. 259,551 to Oatman discloses a television support stand or similar article. U.S. Pat. Des. 321,439 to Lecompte discloses a television stand. U.S. Pat. No. 4,363,460 to Carroll discloses a television stand. U.S. Pat. No. 4,706,920 to Ojima et al. discloses a television stand having a tilt mechanism. U.S. Pat. No. 5,129,611 to Grover et al. discloses a cart with lowerable top wall. U.S. Pat. No. 5,207,405 to Cobb discloses a television stand.

While these devices fulfill their respective, particular objective and requirements, the aforementioned patents do not describe a remote controllable television viewing support that can be positioned such as to tilt or swivel a television upon its actuation with a remote control.

In this respect, the remote controllable television viewing support according to the present invention substantially departs from the conventional concepts and designs of the prior art, and in doing so provides an apparatus primarily developed for the purpose of allowing a user to remotely adjust a position of a television for viewing.

Therefore, it can be appreciated that there exists a continuing need for new and improved remote controllable television viewing support which can be used for allowing a user to remotely adjust a position of a television for viewing. In this regard, the present invention substantially fulfills this need.

SUMMARY OF THE INVENTION

In the view of the foregoing disadvantages inherent in the known types of adjustable television stands now present in the prior art, the present invention provides an improved remote controllable television viewing support. As such, the general purpose of the present invention, which will be described subsequently in greater detail, is to provide a new and improved remote controllable television viewing support and method which has all the advantages of the prior art and none of the disadvantages.

To attain this, the present invention essentially comprises, in combination, a rigid hollow box-shaped base. The base has a planar horizontal bottom wall with a long vertical front wall, a long vertical rear wall, and a pair of short vertical side walls therebetween extended upwards from the bottom wall to define a hollow interior, a rectangular top opening for allowing access to the interior, and a peripheral edge bounding the opening. The base further has a centrally located and vertical mounting tube disposed within the interior. The mounting tube has a lower extent integral with the bottom wall.

A planar rigid rectangular platform is included and positioned directly above of the base. The platform is sized to fully extend over the top opening of the base. The platform has a central portion with a planar upper surface, a planar lower surface, a periphery formed of a pair of long side edges with a pair of short side edges extended therebetween, a substantially horizontal longitudinal axis, a substantially vertical central axis, and a pair of extendable and opposed rectangular extension arms. Each extension arm is coupled to one of the short side edges of the central portion. Each extension arm has a length that is equal to the width of the central portion and a planar upper surface that is coplanar with the upper surface of the central portion. The extension arms are extendable outwards such that the central portion and the arms together create an enlarged supporting surface upon which a television can be placed.

In addition, a rigid central housing is disposed within the base at a location directly above and in axial alignment with the mounting tube. The housing has a circular bottom wall with an integral gear, a horizontal top wall with an axial bore disposed thereon, and a tubular sidewall extended between the top wall and the bottom wall.

A gear is included and coupled to a central portion of the lower surface of the platform. A first and a second electric motor are also provided. The first motor has a fixed stator secured within the housing, a vertically positioned and rotatable rotor extended through the bore on the top wall of the housing, and a bevel gear coupled to the rotor. The bevel gear of the first motor is positioned in mesh the gear on the platform. The stator of the first motor imparts rotation to the rotor when electrically energized to allow the platform to rotate about its longitudinal axis and thereby cause the supported television to tilt. The second motor has a fixed stator secured within the mounting tube of the base and a vertically positioned and a rotatable rotor coupled to the gear of the housing. The stator of the second motor imparts rotation to the rotor when electrically energized to allow the platform to rotate about its central axis and thereby cause the supported television to swivel. An electrical power line is included and coupleable to an external power source for providing electrical energy to the motors.

An infrared signal detecting and switching mechanism is coupled to the front wall of the base, the power source mechanism, and the motors. The infrared signal detecting and switching mechanism is used for momentarily energizing the first motor upon detection of a first infrared signal that is received from free space and for momentarily energizing the second motor upon detection of a second infrared signal that is received from free space. Lastly, a hand-held and manually-operated remote control mechanism is provided positionable at a location remote from the infrared detecting and switching mechanism. The remote control mechanism is used for selectively radiating the first infrared signal and the second infrared signal into free space upon actuation by a user.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved remote controllable television viewing support which has all the advantages of the prior art adjustable television stands and none of the disadvantages.

It is another object of the present invention to provide a new and improved remote controllable television viewing support which may be easily and efficiently manufactured and marketed.

It is a further object of the present invention to provide a new and improved remote controllable television viewing support which is of durable and reliable construction.

An even further object of the present invention is to provide a new and improved remote controllable television viewing support which is susceptible of a low cost of manufacture with regard to both materials and labor, and which accordingly is then susceptible of low prices of sale to the consuming public, thereby making such a remote controllable television viewing support economically available to the buying public.

Still yet another object of the present invention is to provide a new and improved support controllable television viewing support which provides in the apparatuses and methods of the prior art some of the advantages thereof, while simultaneously overcoming some of the disadvantages normally associated therewith.

Even still another object of the present invention is to provide a new and improved remote controllable television viewing support for allowing a user to remote adjust a position of a television for viewing.

Lastly, it is an object of the present invention to provide a new and improved remote controllable television viewing support comprising a rigid base; a rigid platform positioned above of the base and having a substantially horizontal longitudinal axis, a substantially vertical central axis, and a size for supporting a television thereon; an electrical motor mechanism coupled to the platform for allowing the platform to rotate about its longitudinal axis, thereby causing the supported television to tilt, and for allowing the platform to rotate about its central axis, thereby causing the supported television to swivel; a power supply mechanism for providing electrical energy to the motor mechanism; an infrared signal detecting and switching mechanism coupled to the power source mechanism and the motor mechanism for energizing the motor mechanism and allowing for selective rotation of the platform based upon detection of an infrared signal; and hand-held and manually-operated remote control mechanism positionable at a location remote from the infrared detecting and switching mechanism for selectively radiating one of a plurality of infrared signals upon actuation by a user.

These together with other objects of the invention, along with the various features of novelty which characterize the invention, are pointed out with particularity in the claims annexed to and forming a part of this disclosure. For a better undersupporting of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a side-elevational view of the preferred embodiment of the present invention.

FIG. 4 is a plan view of the present invention taken along the line 4—4 of FIG. 3.

FIG. 5 is a cross-sectional view of the present invention taken along the line 5—5 of FIG. 4.

FIG. 6 is a view of the present invention taken along the line 6—6 of FIG. 5.

The same reference numerals refer to the same parts through the various Figures.

DESCRIPTION OF THE PREFERRED EMBODIMENT

Figure 1:
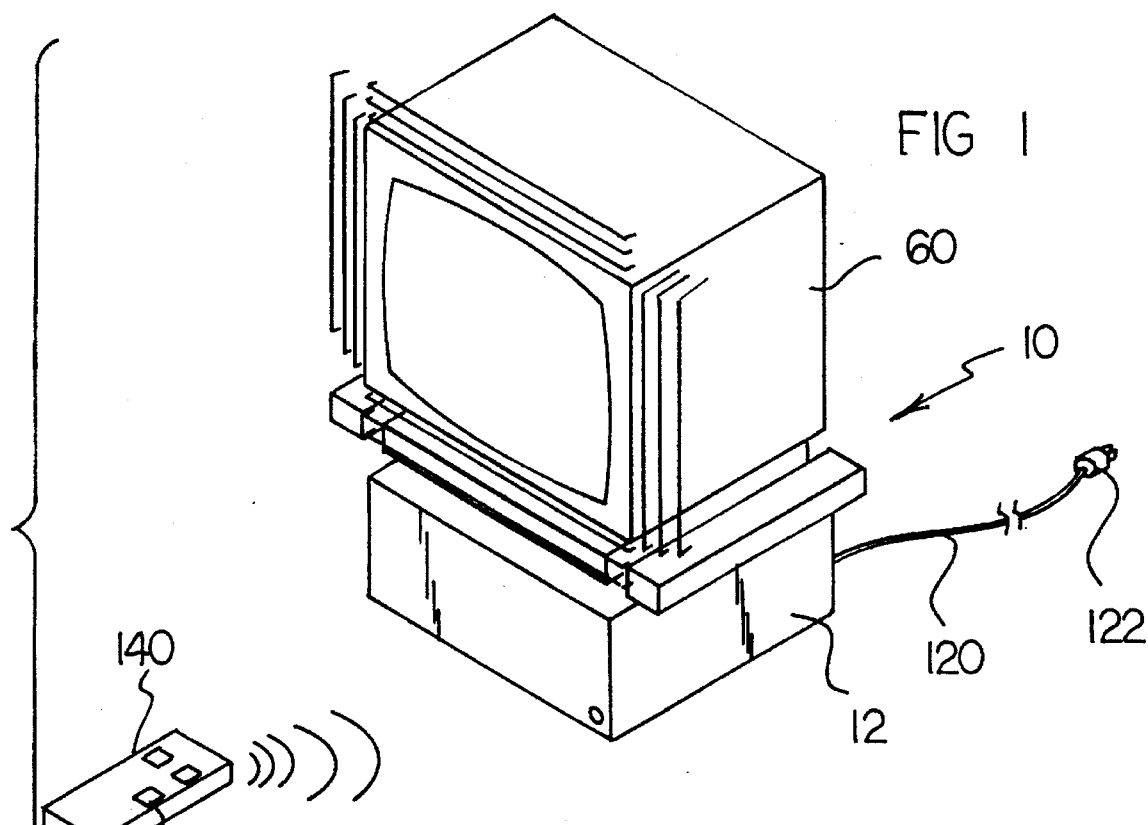
FIG. 1 is a perspective view of the preferred embodiment constructed in accordance with the principles of the present invention in operative association with a supported television.
Figure 2:
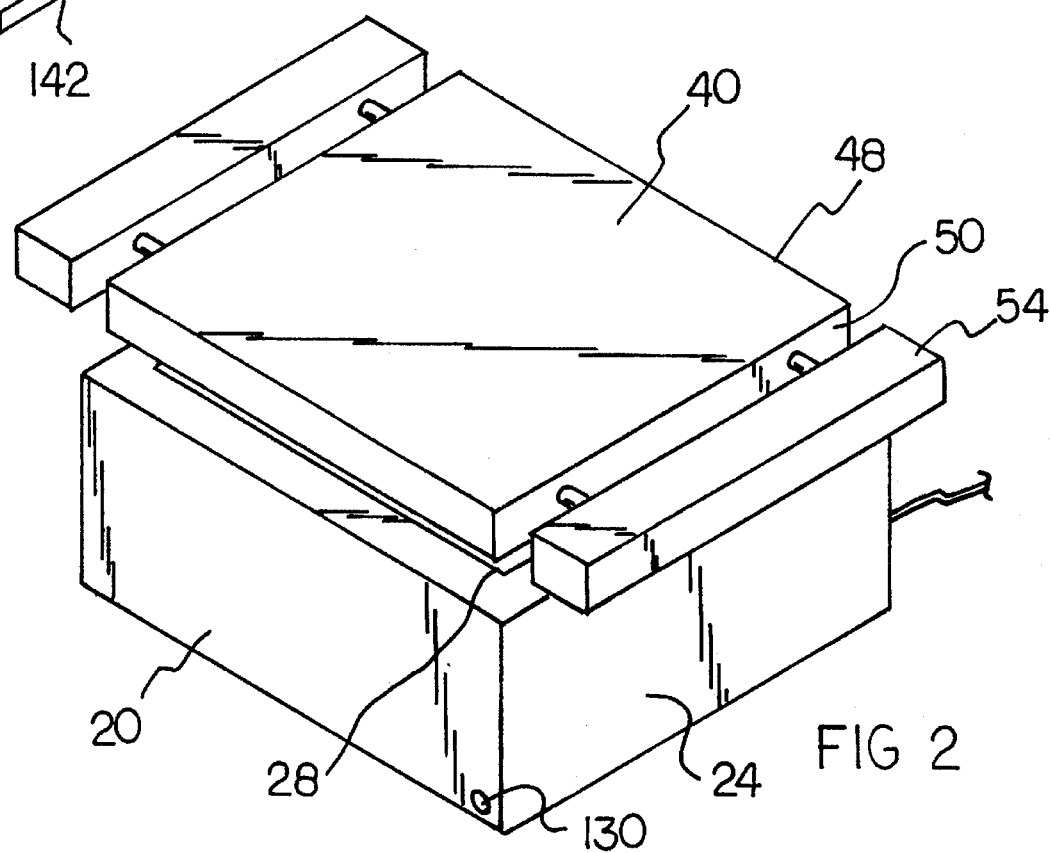
FIG. 2 is a perspective view of the preferred embodiment of the present invention with the television removed.

With reference now to the drawings, and in particular, to FIG. 1 thereof, the preferred embodiment of the new and improved remote controllable television viewing support embodying the principles and concepts of the present invention and generally designated by the reference number 10 will be described.

The preferred embodiment of the present invention comprises a plurality of components. In their broadest context, such components include a base, a platform, two motors, an infrared signal detecting and switching mechanism, and a remote control mechanism. Such components are individually configured and correlated with respect to each other to create a structure that allows a user to adjust a position of a television for viewing from a remote location.

Specifically, the present invention includes a rigid hollow and box-shaped base 12. The base has a planar and horizontal bottom wall 14 that has an upper surface 16 and a lower surface 18. The base also includes a long vertical front wall 20, a long vertical rear wall 22, and a pair of short vertical side walls 24 between the long walls. The vertical walls are coupled to and extended upwards from the bottom wall to define a hollow interior, a rectangular top opening 28 for allowing access to the interior, and a peripheral edge 30 that bounds the opening 28. In addition, the base has a centrally located and vertical rigid mounting tube 32. The mounting tube 32 is disposed within the interior of the base. The mounting tube has a lower extent 34 that is integral with the upper surface 16 of the bottom wall. The mounting tube has a length that is much less than the height of the base.

A planar and rigid rectangular platform 40 is positioned directly above the base. The platform is sized to fully extend over the top opening 28 of the base. The platform has a central portion 42. The central portion has a planar upper surface 44, a planar lower surface 46, and a periphery interconnecting the surfaces. The periphery is formed of a pair of long side edges 48 with a pair of short side edges 50 extended therebetween. A pair of spaced and aligned bores 52 are formed on each side edge. The platform has a substantially horizontal longitudinal axis and a substantially vertical central axis. A pair of extendable and opposed rigid rectangular extension arms 54 are also provided. Each arm is coupled to one of the short side edges 50 of the central portion through use of cylindrical pegs 56, which are slidably secured into bores 52. Each extension arm has a length that is equal to the width of the central portion. Each extension arm additionally has a planar upper surface that is positioned in coplanar alignment with the upper surface of the central portion. The extension arms are extendable outwards from the central portion such that the upper surfaces of the central portion and the arms together create an enlarged supporting surface upon which a television 60 can be placed.

Disposed within the base at a location directly above the mounting tube 32 is a rigid and centrally positioned housing 70. The housing is positioned in axial alignment with the mounting tube 32. The housing has a circular bottom wall 72 with an integral and radial gear 74 formed thereon. The central housing also includes a horizontal planar top wall 76. The top wall has an axial bore 78 that is formed therethrough. A vertical and tubular side wall 80 is couples the top wall with the bottom wall.

A tongue-shaped gear 90 is coupled to a central portion of the lower surface 46 of the platform with a mounting plate 92. The gear 90 is rotatably secured to the top wall 76 of the housing 70 through use of a pair of brackets 92 and a pin 94. The pin is slidably extended within a through hole on the gear 90 and has its ends secured to the brackets.

A first electric motor 100 is provided. The first motor has a fixed stator 102 that is secured within the housing 70 and a vertically positioned and rotatable rotor 104 that is extended through the bore 78 on the top wall of the housing. A bevel gear 106 is coupled to the rotor and positioned in mesh with the gear 90 on the platform. The stator of the first motor imparts rotation to the rotor 104 when electrically energized to engage gear 90 and allow the platform 40 to rotate about its longitudinal axis, thereby causing a supported television 60 to tilt.

In addition, a second motor 110 is provided. The motor 110 has a fixed stator that is secured within the mounting tube 70 of the base and a vertically positioned and rotatable rotor 112 that is coupled to the gear 74 of the housing. The stator of the second motor imparts rotation to the rotor when electrically energized to engage gear 74 and allow the platform 40 to rotate about its central axis, thereby causing the supported television 60 to swivel. Electrical power is provided to the motors through use of a conventional power line 120. The power line is securable to an external and conventional source of line power through use of plug 122. The proximal end of the line is secured to the motors and backfit to the base 12 through use of a grommet 124.

An infrared signal detection and switching mechanism 130 is coupled to the front wall 14 of the base. The infrared signal detection and switching mechanism 130 is further coupled to the power source mechanism and the motors 100, 110. The infrared signal detection and switching mechanism momentarily energizes the first motor upon detection of a first infrared signal that is received from free space. Furthermore, the mechanism 130 momentarily energizes the second motor upon detection of a second infrared signal that is received from free space. The infrared signal detection and switching mechanism 130 is conventional in design and formed of commercially available electronic circuitry that includes an infrared sensor and relays.

Lastly, the present invention includes a conventional hand-held and manually-operated remote control mechanism 140. The remote control mechanism is positionable at a location remote from the infrared detecting and switching mechanism 130. The remote control mechanism 140 selectively radiates a first infrared signal or a second infrared signal into free space upon actuation by and discretion of a user through selected keys 140. Thus, if a user wants to tilt or rotate the television, the appropriate keys on the remote control mechanism 140 are momentarily depressed.

The present invention allows a television to swivel to the left or right or tilt up or down through the use of a remote control. The platform of the present invention can be adjusted to accommodate different sized televisions. Preferably, the platform and base of the present invention are formed of a high-impact resistant plastic. The present invention can be used in homes and in hotels, motels, hospitals, nursing homes, or the like. Preferably, the gears of the present invention are formed such that the supported television can be titled approximately 3 inches from side to side and swiveled about 3 inches front to back.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. A remote controllable television viewing support for allowing a user to remote adjust a position of a television supported on said support for viewing comprising, in combination:

a rigid hollow box-shaped base having a planar horizontal bottom wall with a long vertical front wall, a long vertical rear wall, and a pair of short vertical side walls therebetween extended upwards from the bottom wall to define a hollow interior, a rectangular top opening for allowing access to the interior, and a peripheral edge bounding the opening, the base further having a centrally located and vertical mounting tube disposed within the interior and with the mounting tube having a lower extent integral with the bottom wall;

a planar rigid rectangular platform positioned directly above of the base and sized to fully extend over its top opening, the platform having a central portion with a planar upper surface, a planar lower surface, a periphery formed of a pair of long side edges with a pair of short side edges extended therebetween, a substantially horizontal longitudinal axis, a substantially vertical central axis, and a pair of extendable and opposed rectangular extension arms with each arm coupled to one of the short side edges of the central portion, each arm having a length that is equal to the width of the central portion and a planar upper surface that is coplanar with the upper surface of the central portion, and with the arms being extendable outwards from the central portion such that the central portion and the arms together create an enlarged supporting surface upon which a supported television is placed;

a rigid central housing disposed within the base at a location directly above and in axial alignment with the mounting tube, the housing having a circular bottom wall with an integral gear, a horizontal top wall with an axial bore disposed thereon, and a tubular sidewall extended between the top wall and the bottom wall, a gear coupled to a central portion of the lower surface of the platform;

a first electric motor having a fixed stator secured within the housing, a vertically positioned and rotatable rotor extended through the bore on the top wall of the housing, and a bevel gear coupled to the rotor and positioned in mesh the gear on the platform, and with a stator of the first motor imparting rotation to the rotor of the first electric motor when electrically energized to allow the platform to rotate about its longitudinal axis and thereby cause the supported television to tilt;

a second motor having a fixed stator secured within the mounting tube of the base and a vertically positioned and a rotatable rotor coupled to the gear of the housing, and with the stator of the second motor imparting rotation to the rotor of the second electric motor when electrically energized to allow the platform to rotate about its central axis and thereby cause the supported television to swivel;

an electrical power line coupleable to an external power source for providing electrical energy to the motors;

infrared signal detecting and switching means coupled to the front wall of the base, the power source means, and the motors for momentarily energizing the first motor upon detection of a first infrared signal that is received from free space and for momentarily energizing the second motor upon detection of a second infrared signal that is received from free space; and hand-held and manually-operated remote control means positionable at a location remote from the infrared detecting and switching means for selectively radiating a first infrared signal and a second infrared signal into free space upon actuation by a user.

2. A remote controllable television support for supporting a television comprising:

a rigid base;

a rigid platform positioned above of the base and having a substantially horizontal longitudinal axis, a substantially vertical central axis, and a size for supporting a television thereon;

a pair of electrical motor means coupled to the platform for causing the platform to rotate about its longitudinal axis, thereby causing a supported television to tilt, and for causing the platform to rotate about its central axis, thereby causing the supported television to swivel;

power supply means for providing electrical energy to the motor means;

infrared signal detecting and switching means coupled to the power source means and the motor means for energizing the motor means and allowing for selective rotation of the platform based upon detection of an infrared signal; and hand-held and manually-operated remote control means positionable at a location remote from the infrared detecting and switching means for selectively radiating one of a plurality of infrared signals upon actuation by a user;

wherein the base has a planar horizontal bottom wall with a long vertical front wall, a long vertical rear wall, and a pair of short vertical side walls therebetween extended upwards from the bottom wall to define a hollow interior, a rectangular top opening for allowing access to the interior, and a peripheral edge bounding the opening, the base further having a centrally located and vertical mounting tube disposed within the interior and with the mounting tube having a lower extent integral with the bottom wall; and wherein a second motor is secured within the mounting tube.

* * * * *